United States Patent [19]
Donnelly et al.

[11] Patent Number: 5,718,743
[45] Date of Patent: Feb. 17, 1998

[54] DESICCANT CARTRIDGE

[75] Inventors: Peter J. Donnelly, Williamsville; Samuel A. Incorvia, North Tonawanda, both of N.Y.

[73] Assignee: Multisorb Technologies, Inc., Buffalo, N.Y.

[21] Appl. No.: 605,494

[22] Filed: Feb. 26, 1996

[51] Int. Cl.⁶ ........................ B01D 53/02
[52] U.S. Cl. .................. 96/135; 95/117; 96/147; 96/152; 210/266; 210/282; 210/DIG. 6
[58] Field of Search .................. 95/90, 117, 91; 96/108, 135, 147, 151, 152, 153, 144, 118; 55/512; 210/282, 266, DIG. 6

[56] References Cited

U.S. PATENT DOCUMENTS

| | | | |
|---|---|---|---|
| 2,758,719 | 8/1956 | Line | 96/147 |
| 3,799,352 | 3/1974 | McClive | 210/282 |
| 3,879,292 | 4/1975 | McClive | 210/282 |
| 4,400,187 | 8/1983 | Lane | 96/144 |
| 4,436,623 | 3/1984 | Cullen et al. | 210/282 |
| 4,457,843 | 7/1984 | Cullen et al. | 210/282 |
| 4,659,467 | 4/1987 | Spearman | 96/147 |
| 5,215,660 | 6/1993 | Mosher et al. | 210/282 |
| 5,569,316 | 10/1996 | Flaugher et al. | 96/147 |
| 5,580,451 | 12/1996 | Tack | 96/108 |

*Primary Examiner*—Duane S. Smith
*Attorney, Agent, or Firm*—Joseph P. Gastel

[57] ABSTRACT

A desiccant cartridge including a molded plastic shell having an outer cylindrical portion and an inner tubular portion connected by a plurality of ribs which extend therebetween, a molded plastic end cover grid secured in each of the opposite ends of the molded plastic shell and being attached to both the outer cylindrical portion and the inner tubular portion, annular porous felt members secured to the inner sides of the molded plastic end cover grids, and desiccant in the annular space between the outer cylindrical portion of the shell and the inner tubular portion thereof.

37 Claims, 5 Drawing Sheets

DESICCANT CARTRIDGE

BACKGROUND OF THE INVENTION

The present invention relates to an improved desiccant cartridge for use in a refrigerant receiver.

By way of background, there are numerous types of desiccant cartridges utilized in refrigerant receivers and accumulators including many which are mounted on a central pipe within a receiver and which are sealed both to the pipe and to the inside surface of the receiver shell so that refrigerant passes therethrough and is subjected to the drying action of the desiccant.

SUMMARY OF THE INVENTION

It is one object of the present invention to provide an improved desiccant cartridge for a refrigerant receiver which is fabricated from a plurality of molded plastic parts which are associated in an unique manner.

It is another object of the present invention to provide an improved desiccant cartridge for a refrigerant receiver which can be fabricated and assembled with relative ease in a plurality of selectively different configurations. Other objects and attendant advantages of the present invention will readily be perceived hereafter.

The present invention relates to a desiccant cartridge comprising a molded plastic shell including an outer annular portion and an inner tubular portion and integral ribs securing said inner tubular portion within said outer annular portion to define a space therebetween, first and second ends on said molded plastic shell, a molded plastic end cover grid secured to at least said first end of said molded plastic shell, said molded plastic end cover grid including an outer annular rim and an inner annular rim and a plurality of crossmembers extending crosswise to each other with open spaces therebetween, said crossmembers having inner crossmember portions facing said ribs and outer crossmember portions facing away from said ribs, a porous disc secured to said molded plastic end cover grid between said inner and outer annular rims, and desiccant within said space between said inner tubular portion and said outer cylindrical shell.

The various aspects of the present invention will be more fully understood when the following portions of the specification are read in conjunction with the accompanying drawings wherein:

DESCRIPTION OF THE PREFERRED EMBODIMENTS

Figures 1, 3, 13, 14:
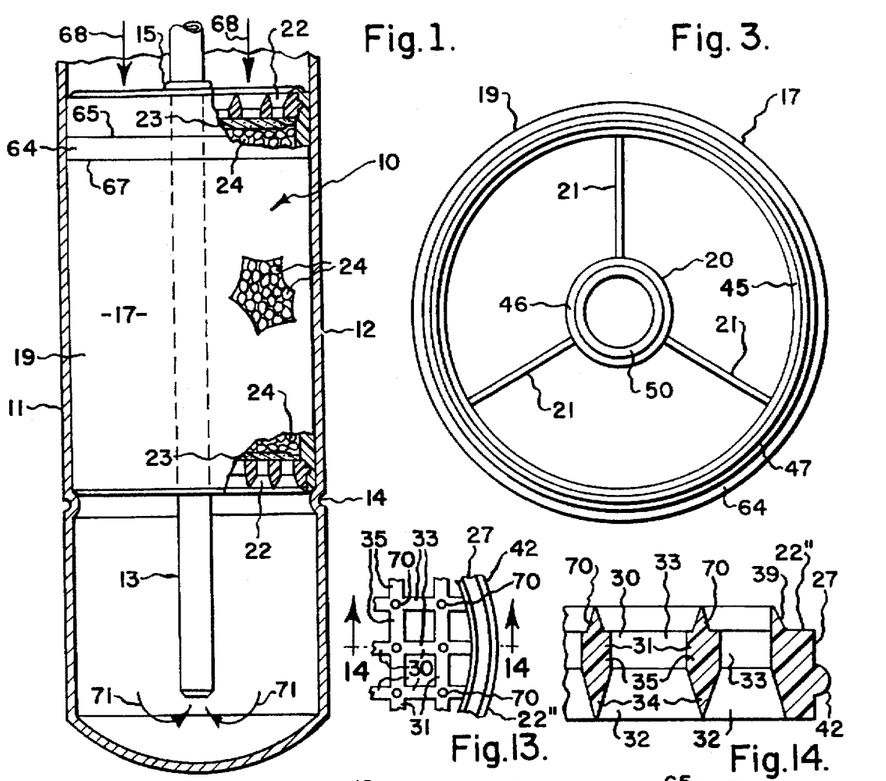
FIG. 1 is a fragmentary view, partially in cross section showing the improved desiccant cartridge of the present invention in position in a refrigerant receiver.
FIG. 3 is a view taken substantially in the direction of arrows 3—3 of FIG. 2.
FIG. 13 is a fragmentary view similar to FIG. 6 but showing a modified configuration of the end cover grid.
FIG. 14 is a fragmentary enlarged cross sectional view taken substantially along line 14—14 of FIG. 13.

The improved desiccant cartridge 10 of the present invention is shown in FIG. 1 in position in a refrigerant receiver 11 of an air conditioning system. The receiver 11 includes an outer shell 12 and an internal conduit 13 which extends through cartridge 10. Cartridge 10 is positioned between an annular bead 14 which is rolled into receiver shell 12 and an annular bead 15 which is rolled onto tube 13. Receiver 11, aside from the foregoing beads 14 and 15, may be of any conventional type known in the art such as shown, for example, in U.S. Pat. Nos. 4,436,623 and 5,215,660, the relevant portions of which are shown in FIGS. 1 and 5, respectively, of these patents and are incorporated herein by reference.

Figure 2:
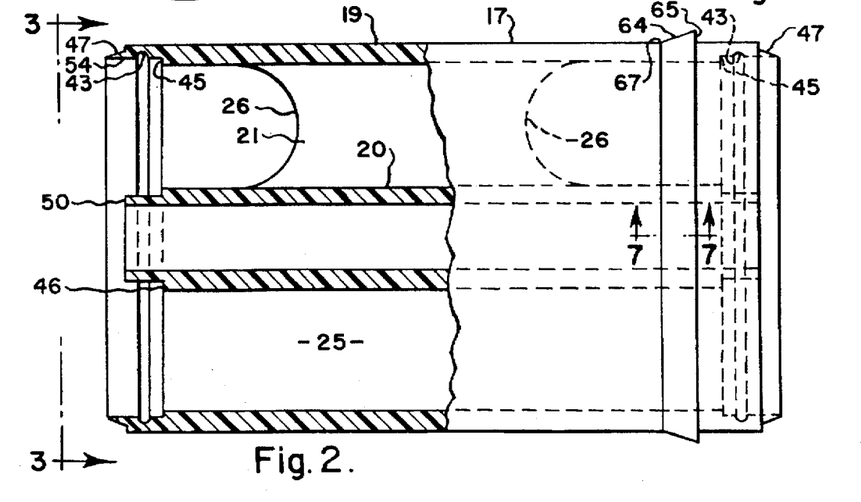
FIG. 2 is an enlarged side elevational view, partially in cross section of the shell of the desiccant cartridge.

The improved desiccant cartridge 10 includes a molded polyethylene shell 17 having an outer cylindrical portion 19 and an inner tubular portion 20 which are connected to each other by ribs 21 which are molded integrally therewith. As can be seen from FIGS. 2 and 3, there are three ribs 21 in the central portion of the shell 17. Ribs 21 are spaced 120° from each other and terminate at curved ends 26 (FIG. 2).

An end cover grid 22 having an annular polyester felt disc 23 (FIGS. 8–12) secured thereto is fixedly positioned at each end of shell 17, and a suitable desiccant 24, which is preferably molecular sieve, is contained in the annular space between outer cylindrical shell portion 19 and inner tubular portion 20. Since ribs 21 occupy only part of the space between outer cylindrical portion 19 and tubular portion 20, there will be more space for desiccant in shell 17. In addition, since the curved ends 26 of ribs 21 are spaced from the end cover grids 22, when the desiccant cartridge 10 is in a vertical position, there will be a continuous layer of desiccant on the felt of the lower end cover grid.

Each cover grid 22 includes an outer annular rim 27 and an inner annular rim 29. A plurality of crossmembers 30 and 31 extend substantially perpendicularly to each other and are molded to each other, and the grid defined by crossmembers 30 and 31 is molded between inner annular rim 29 and outer annular rim 27. The crossmembers 30 and 31 define open spaces 28 therebetween. The crossmembers 30 and 31 are formed in the cross sectional configuration shown in FIGS. 5, 5A and 5B. More specifically, crossmembers 30 have outer triangular portions 32 which taper to a point and they include relatively wide portions 33 which face the inside of the shell 17. Crossmembers 31 also include relatively narrow tapered triangular portions 34 and relatively wide portions 35. Relatively wide portions 33 and 35 are molded to each other, as can be seen from FIG. 6. The relatively narrow portions 32 and 34 taper away from the relatively wide portions 33 and 35, respectively, to provide an airfoil configuration.

An annular polyester porous felt disc 23 has an outer annular portion 37 (FIG. 8) fused to outer annular energy director 39 (FIGS. 5 and 5B), and it has an inner annular portion 40 fused to inner annular energy director 41. The outer annular energy director 39 and the inner annular energy director 41 are originally of the triangular cross section shown in FIGS. 5 and 5B, and when heat and pressure is applied to annular portions 37 and 40 of annular polyester disc 23, the energy directors 39 and 41, respectively, will fuse to annular disc portions 37 and 40, respectively, and in so doing they will lose their triangular structure and just become flat fusing areas. The porous felt disc is thus securely bonded to the end cover grid 22, and it assumes the position shown in FIGS. 8–12.

Figure 9:
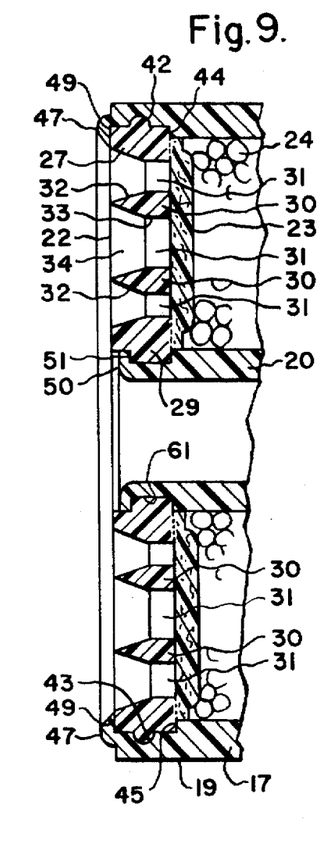
FIG. 9 is a fragmentary cross sectional view showing the end cover grid in position within the shell and being retained therein by both a bead and groove connection and by staking.

The molded plastic end cover grids with the annular polyester felt discs secured thereto can be secured to the ends of shell 17 in any number of ways as depicted in FIGS. 9–12, inclusive. In FIG. 9 an end cover grid 22 is secured to the end of shell 17 by means of a connection between annular bead 42 on outer annular rim 27 and annular groove 43 which is molded into outer cylindrical shell portion 19. In addition, the outer annular edge portion 44 of outer annular rim 27 rests on annular shoulder 45 of outer cylindrical shell portion 19 and the inner annular edge of inner annular rim 29 rests on shoulder 46 to tube 20. Additionally, the annular flange 47 (FIGS. 2 and 9) is staked over from its position of FIG. 2 to its position of FIG. 9 to bear against the annular end 49 of end cover grid 22. Additionally, the annular end 50 of tubular portion 20 is rolled over or staked from its position of FIG. 2 to its position of FIG. 9 so as to bear against the annular shoulder 51 of end cover grid 22. While only one end cover grid 22 is shown in FIG. 9 at the end of molded plastic shell 17, it will be appreciated that another end cover grid 22 can be secured in the same manner at the other end of molded plastic shell 17, or one end of shell 17 can have any type of perforated cover secured thereto or formed integrally therewith.

Figure 10:
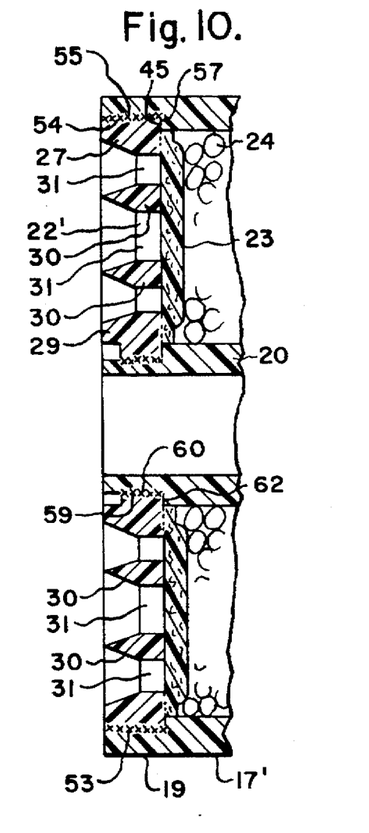
FIG. 10 is a cross sectional view similar to FIG. 9 but showing the end cover grid in position within the shell and held therein by peripheral fused joints obtained by spin-welding.

In FIG. 10 another construction for securing end cover grid 22 to at least one end of molded plastic shell 17 is shown. In this regard, the end cover grid 22 is secured by spin welding which is achieved by holding plastic shell 17 stationary and spinning a modified end cover grid 22' so that the friction generated between the outer edge 53 of the end cover grid 22' and the inner annular edge 54 of shell 17' will cause an annular fused joint 55 to develop therebetween. The fused joint may also be existent at annular area 57, namely, between outer edge portion 44 (FIG. 9) of the end cover grid and shoulder 45 of shell 17'. In the embodiment of FIG. 10 the end cover grid 22' has been modified by the elimination of annular bead 42, and shell 17' has been modified by the elimination of annular groove 43 of FIG. 9. However, if desired the bead and groove may be retained. It is to be noted that there is also a fused joint 59 between the inner annular edge 60 of end cover grid 22' and annular edge portion 61 (FIG. 9) of inner tubular portion 20. There may also be a fused joint at 62.

Figure 11:
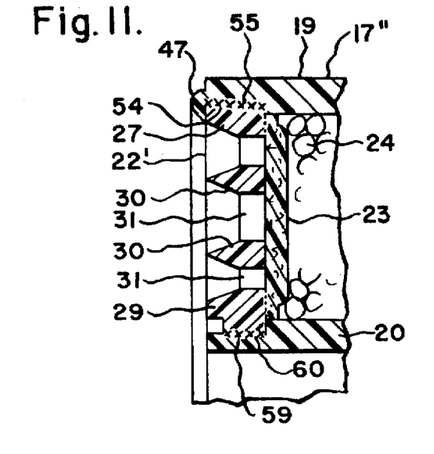
FIG. 11 is a fragmentary view similar to FIGS. 9 and 10 but showing the end cover grid held in position within the shell by a combination of a fused joint obtained by spin-welding and by staking.

In FIG. 11 there is shown a further modified manner of securing an end cover grid 22' of FIG. 10 into the ends of a further modified shell 17". In this respect, the end cover grid 22' may be identical to that disclosed in FIG. 10. As noted above, end cover grid 22' is spun-weld into shell 17" in the same manner as described above relative to FIG. 10, and like numerals depict like elements of structure. However, the shell 17" of FIG. 11 differs from the shell 17' of FIG. 10 in that it has an annular flange 47 which has been rolled over or staked in the manner described above relative to FIG. 9. Thus, in essence, the embodiment of FIG. 11 has the staked feature of FIG. 9 and the spun-welded features of FIG. 10, but does not have the bead and groove connection of FIG. 9.

Figure 12:
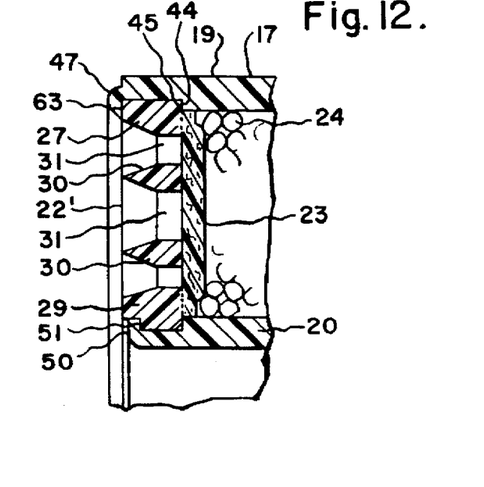
FIG. 12 is a fragmentary cross sectional view similar to FIGS. 9-11 but showing the end cover grid held in position within the shell by staking only.

In FIG. 12 a still further embodiment is disclosed wherein the end cover grid 22' is secured in the end of shell 17 by merely staking the annular flange 47 over the end 63 of end cover grid 22' and also staking annular portion 50 against shoulder 51 as described above relative to FIG. 9, without utilizing the connection between the annular bead 42 and the annular groove 43 of FIG. 9.

Figure 7:
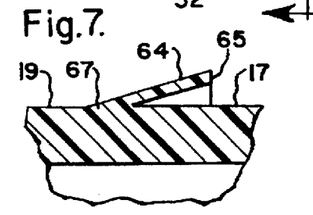
FIG. 7 is a fragmentary enlarged view taken substantially along line 7—7 of FIG. 2 and showing the seal on the outside of the cartridge shell.
Figure 8:
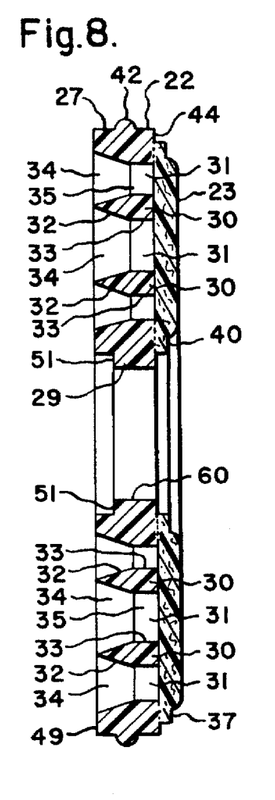
FIG. 8 is an enlarged cross sectional view of the end cover grid similar to FIG. 5 and showing a polyester felt disc secured to the inside surface of the end cover grid.

From FIGS. 1, 2 and 7 it can be seen that the outer cylindrical portion 19 of shell 17 includes an annular flexible sealing lip 64 molded integrally therewith. Lip 64 has a free outer end 65 and an inner end 67 which is the portion thereof which is molded to outer cylindrical shell portion 19. As can be visualized from FIG. 1, the desiccant cartridge 10 is slid downwardly into receiver shell 12. This being the case, the annular lip 64 will flex inwardly as the outer portion thereof engages the inner surface of the receiver. The natural resilience of lip 64 will effect a seal. This seal is desirable inasmuch as the shell 12 is never perfectly cylindrical. However, there is no seal between pipe 13 and inner tubular portion 20 because the tolerances between the two can be held relatively closely whereas this is not the case with the inner surface of receiver shell 12.

The arrows 68 in FIG. 1 depict the direction of refrigerant flow through desiccant cartridge 10, and the arrows 71 depict the direction of refrigerant flow into receiver tube 13 after the refrigerant has flowed through desiccant cartridge 10. It is to be noted that the crossmembers 30 and 31 of the upper end cover grid 22 have their narrow portions 32 and 34 facing the incoming flow and thus these portions serve as airfoils to provide lessened resistance to flow.

Figures 4, 5:
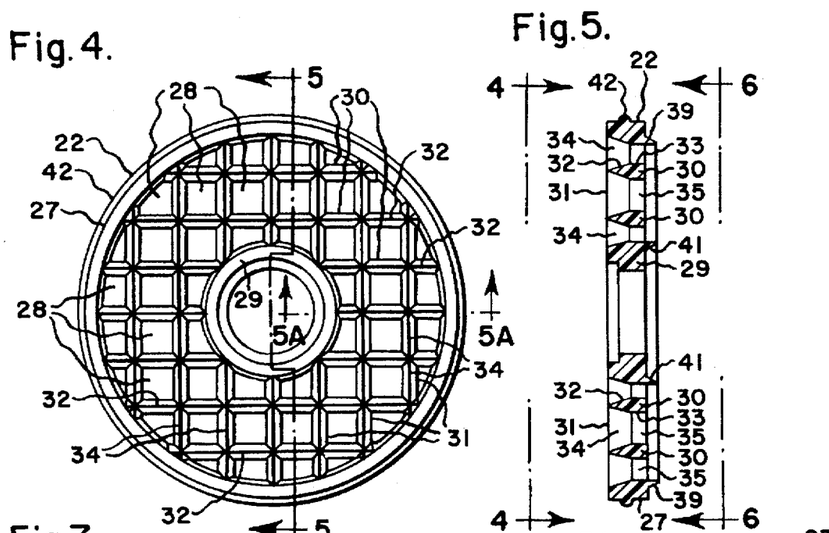
FIG. 4 is a plan view of an end cover grid for the desiccant shell of FIG. 2.
FIG. 5 is a cross sectional view taken substantially along line 5—5 of FIG. 4.
Figure 5A:
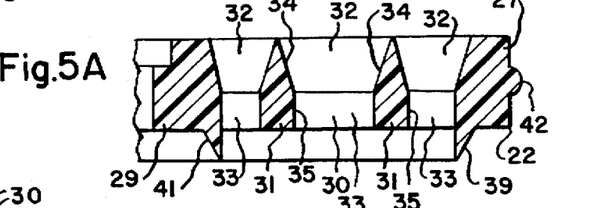
FIG. 5A is an enlarged fragmentary cross sectional view taken substantially along line 5A—5A of FIG. 4.
Figures 5B, 6:
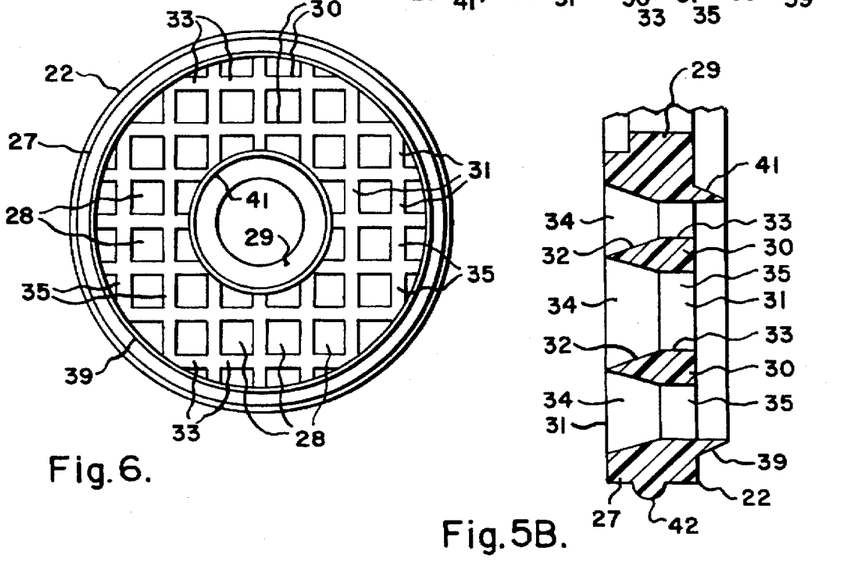
FIG. 5B is an enlarged fragmentary view of a portion of FIG. 5 showing the shape of the energy directors.
FIG. 6 is a view of the end cover grid taken substantially in the direction of arrows 6—6 of FIG. 5.

In FIGS. 13 and 14 a modified end cover grid 22" is shown which may be identical in all respects to end cover grid 22 of FIGS. 4–6 except that it additionally has conical energy director points 70 located at the junctions of crossmembers 30 and 31, where enlarged portions 33 and 35 cross each other. The energy director points 70 will fuse the polyester disc 23 to crossmembers 30 and 31 at the crossover points 70. Thus, in the embodiment of FIGS. 13 and 14 the felt disc will be bonded at both the energy director points 70 and the annular energy directors 39 and 41 which are shown in FIG. 5.

Figure 15:
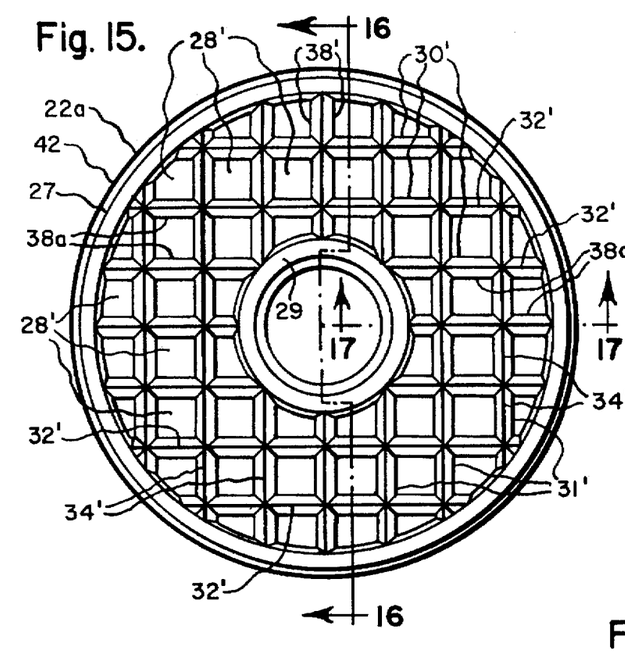
FIG. 15 is a plan view of a modified embodiment of an end cover grid for the desiccant shell of FIG. 2.
Figure 16:
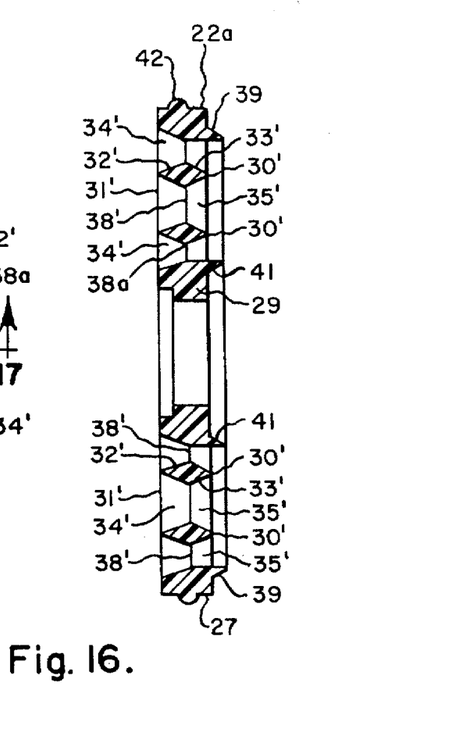
FIG. 16 is a cross sectional view taken substantially along line 16—16 of FIG. 15.
Figure 17:
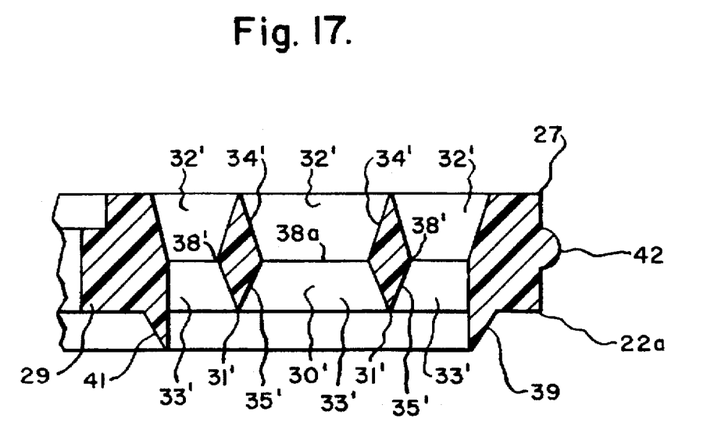
FIG. 17 is a fragmentary cross sectional view taken substantially along line 17—17 of FIG. 15.

In FIGS. 15–17 a modified end cover grid 22a is shown. End cover grid 22a includes an outer annular rim 27 and an inner annular rim 29, as in end cover grid 22. A plurality of crossmembers 30' and 31' extend substantially perpendicularly to each other and are molded to each other, and the grid defined by crossmembers 30' and 31' is molded between inner annular rim 29 and outer annular rim 27. The crossmembers 30' and 31' define open spaces 28' therebetween. The crossmembers 30' are formed in the cross sectional configuration shown in FIGS. 16 and 17. More specifically, crossmembers 30' have outer triangular portions 32' which taper to a point and they also include triangular portions 33' which face the inside of the shell 17. Crossmembers 31' (FIG. 17) also include triangular portions 34' and triangular portions 35'. Crossmembers 30' and 31' are molded to each other at junctions 38a and 38'. Triangular portions 32', 33', 34' and 35' are airfoil configurations. In this respect, when the end cover grids 22a are installed, triangular portions 32' and 34' of the upper end cover (FIG. 1) will be facing the direction 68 of flow, and triangular portions 33' and 35' of the lower end cover (FIG. 1) will be facing the direction of flow of fluid through shell 17. Thus there will be no relatively wide portions of the grid, such as portions 33 and 35, as shown in FIGS. 5A and 5B, facing the direction of flow. End cover grids 22a will have annular porous felt discs 23 secured thereto in the same manner as described above relative to end cover grids 22, namely, by being fused to energy directors 39 and 41 which are identical to energy directors 39 and 41 described above relative to FIGS. 5A and 5B.

Figure 18:
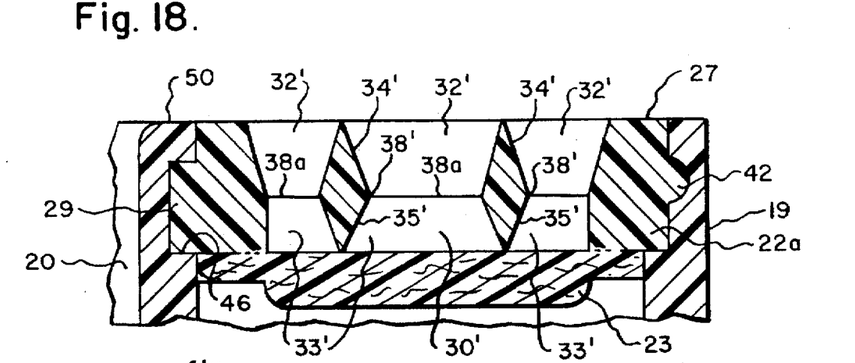
FIG. 18 is a cross sectional view showing the porous felt member bonded to the end cover grid of FIGS. 15-17 which is mounted in an outer shell.

In FIG. 18 the end cover grid 22a of FIG. 17 is shown mounted in a cartridge shell with a porous felt 23 bonded thereto. The energy directors 39 and 41 are not seen because they fuse into the porous felt member. The outer rim is shown mounted in the manner described above relative to FIG. 9, except that there is no annular staked flange 47. The annular end 50 of tube 20 is staked over inner annular rim 29. It will be appreciated that any of the foregoing modes of securing the end cover grid to the shell may be employed.

Figure 19:
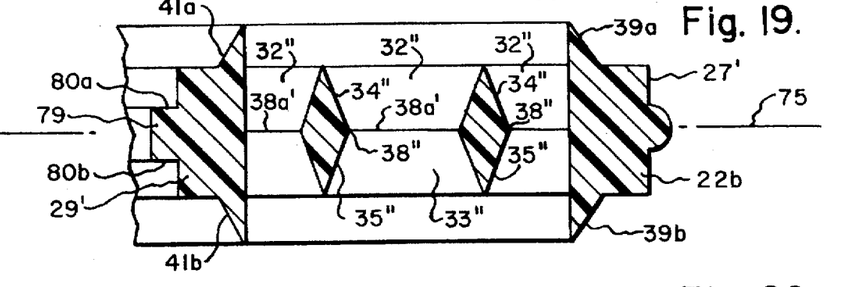
FIG. 19 is a fragmentary cross sectional view showing an universal modified end cover grid which is symmetrical about a horizontal centerline and thus can be mounted in a shell with either side facing away from the inside of the shell.
Figure 20:
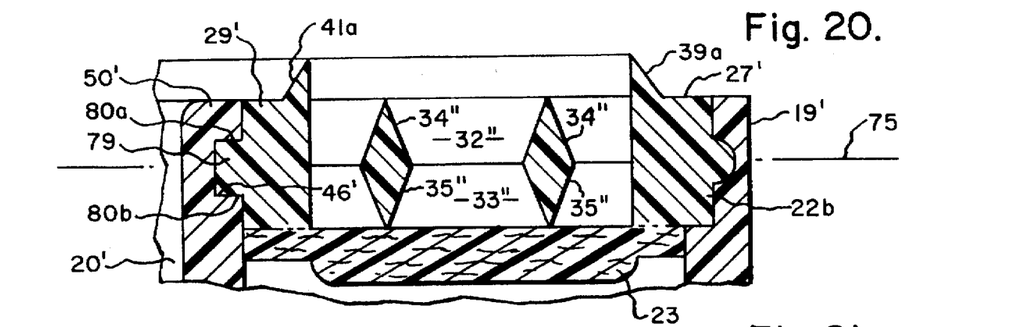
FIG. 20 is a fragmentary cross sectional view showing the end cover grid of FIG. 19 mounted in a modified cartridge shell with a porous felt member located within the shell.
Figure 21:
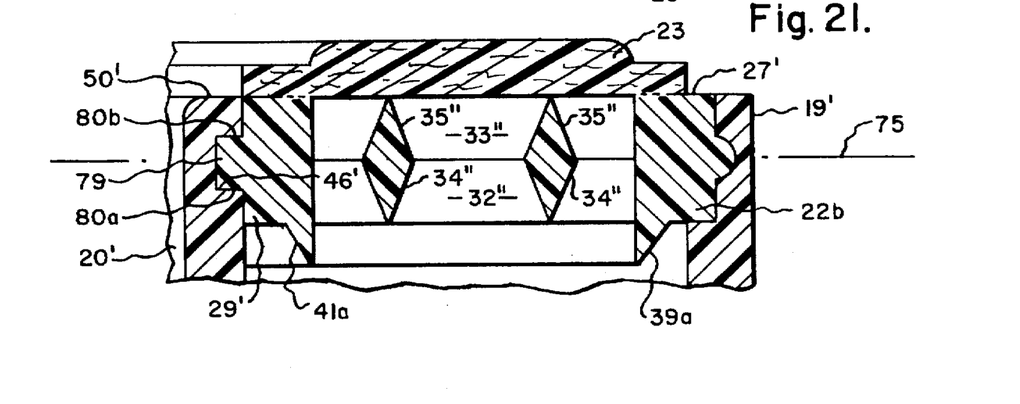
FIG. 21 is a fragmentary cross sectional view similar to FIG. 20 but showing the end cover grid mounted in an inverted position with the porous felt member located outside of the cartridge shell.

In FIGS. 19, 20 and 21 a further modified end cover grid 22b is shown. It is universal in that it is symmetrical about horizontal centerline 75 so that it can be installed with either side facing either toward or away from the inside of shell 19', which is analogous to shell 19 except that center tube 20' differs slightly from center tube 20 of FIGS. 2 and 18. Parts of end cover grid 22b are analogous to parts of end cover grid 22a, and such parts will be designated with the same numeral plus an additional prime and will not be further described. Additionally, end cover grid 22b differs from end cover grid 22a in that it is symmetrical about centerline 75 whereas grid 22a is not. The outer rim 27' of grid 22b differs from outer rim 27 of FIGS. 15–18 in that it has an annular energy director 39a on one side of rim 27' and an annular energy director 39b on the opposite side. In addition it differs from the preceding figures in that the inner rim 29' is symmetrical about horizontal centerline 75, and it has an annular energy director 41a on one side and an annular energy director 41b on the opposite side, and it has an inner annular ridge 79 which provides annular shoulders 80a and 80b.

In FIG. 20 the universal end cover grid 22b is shown mounted in shell 19' with a porous felt member 23 located facing the inside of the cartridge. It is to be noted that the center tube 20' differs slightly from center tube 20 of FIGS. 2 and 18 in that the shoulder 46' is located higher up than shoulder 46 of center tube 20, as can be observed from a comparison of FIGS. 18 and 20. Thus, the reduced end portion 50', which is analogous to end 50 of FIG. 18, is shorter. As can be seen from FIG. 20, the end 50' is staked over so that it engages shoulder 80a, and further, in the installed position, the shoulder 80b rests on shoulder 46' of tube 20'. Additionally, when the end cover grid 22b is mounted with the porous felt member 23 facing the inside of shell 19', the annular energy director 39a, remains undisturbed.

If desired, the end cover grid 22b may be mounted in an inverted position with the porous felt member 23 facing away from the inside of the shell 19'. In this event, shoulder 80a will rest on tube shoulder 46' and tube end 50' will be staked onto shoulder 80b. In this event, the annular energy director 39a will be located on the inside of shell 19'.

In view of the universal symmetrical aspect of end cover grid 22b, it is merely necessary to attach the porous felt member to one side thereof, and thereafter the universal end cover grid 22b can be mounted on either end of tubular shell 19'; either with the felt 23 facing the inside of the shell or facing away from the inside of the shell. As noted above, end cover grid 22b is described as being symmetrical about horizontal centerline 75. However, it need be only substantially symmetrical in the sense that if it is to be positioned in either an upright or inverted position, as shown in FIGS. 20 and 21, respectively, only the shoulders 80a and 80b and the shoulders (not numbered) on outer rim 27' need be spaced equidistantly from centerline 75, but the crossmembers 34" and 35" and the crossmembers 32" and 33" need not be perfectly symmetrical.

While FIGS. 18–21 have depicted the end cover grids secured by a bead 42 and a staked center post 50, it will be appreciated that any method of securing the end cover grid may be used, including but not limited to the ways shown in FIGS. 9–12.

The polyester felt which has been used for both the upper and lower discs 23 is a polyester needled felt and has the following physical characteristics. The staple blend is 100% 6 Denier×3.00, long minimum. The needling is 700–750 penetrations per square inch. It has a weight of 10–13 ounces per square yard and a thickness of 0.160–0.180 inches and a tensile strength of 50 pounds per inch minimum in both directions. It also has an air permeability of 150–300 SCFM and a Mullen Burst of 100 pounds minimum.

It is also contemplated that the above-described polyester felt can be used for the outlet side of the cartridge 10, that is, the lower side in FIG. 1, and the upper polyester felt, that is the one on the incoming side of the flow which is closest to seal 64, can have the following characteristics. It can have a thickness of 0.140–0.180 inches and a weight of 8.5–10.5 ounces per square yard and an air permeability of 130–200 cubic feet per minute. It will also have a woven scrim on the opposite side of the incoming flow to the grid. It also has the staple blend and needling of the polyester felt described in the preceding paragraph. The coarser felt on the incoming side of the flow will create less of a pressure drop than a finer felt, and it may permit some fine impurities to pass therethrough which will be trapped by the desiccant and or the felt on the outlet side of the cartridge.

While specific felts have been disclosed it will be appreciated, however, that any suitable porous filters for discs 23 may be used which will provide the desired filtration and pressure drop.

While a preferred embodiment of desiccant has been noted above as being molecular sieve, it will be appreciated that silica gel or any other suitable type of desiccant may be used, as desired.

While preferred embodiments of the present invention have been disclosed, it will be appreciated that it is not limited thereto but may be otherwise embodied within the scope of the following claims.

What is claimed is:

1. A desiccant cartridge comprising a molded plastic shell having first and second ends and including an outer annular portion and an inner tubular portion and integral ribs between said first and second ends securing said inner tubular portion within said outer annular portion to define a space therebetween, a molded plastic end cover grid mounted on at least said first end of said molded plastic shell, said molded plastic end cover grid including an outer annular rim and an inner annular rim and a plurality of crossmembers extending crosswise to each other with open spaces therebetween, said crossmembers having inner crossmember portions facing said ribs and outer crossmember portions facing away from said ribs, a porous disc secured to said molded plastic end cover grid between said inner and outer annular rims, and desiccant within said space between said inner tubular portion and said outer cylindrical shell.

2. A desiccant cartridge as set forth in claim 1 wherein said outer annular portion of said molded plastic shell includes an outer surface, and an annular flexible sealing lip molded integrally with and extending outwardly from said outer surface of said outer annular portion of said shell.

3. A desiccant cartridge as set forth in claim 1 including a second molded plastic end cover grid located at said second end of said shell.

4. A desiccant cartridge as set forth in claim 3 wherein said outer annular portion of said molded plastic shell includes an outer surface, and an annular flexible sealing lip molded integrally with and extending outwardly from said outer surface of said outer annular portion of said shell.

5. A desiccant cartridge as set forth in claim 1 wherein said ribs include ends which are spaced from said first and second ends of said shell.

6. A desiccant cartridge as set forth in claim 5 including a second molded plastic end cover grid located at said second end of said shell.

7. A desiccant cartridge as set forth in claim 6 wherein said outer annular portion of said molded plastic shell includes an outer surface, and an annular flexible sealing lip molded integrally with and extending outwardly from said outer surface of said outer annular portion of said shell.

8. A desiccant cartridge as set forth in claim 1 wherein said molded plastic end cover grid includes energy director members, and wherein said porous disc is fused to said end cover grid at said energy director members.

9. A desiccant cartridge as set forth in claim 8 wherein said outer annular portion of said molded plastic shell includes an outer surface, and an annular flexible sealing lip molded integrally with and extending outwardly from said outer surface of said outer annular portion of said shell.

10. A desiccant cartridge as set forth in claim 9 including a second molded plastic end cover grid located at said second end of said shell.

11. A desiccant cartridge as set forth in claim 10 wherein said ribs include ends which are spaced from said first and second ends of said shell.

12. A desiccant cartridge as set forth in claim 8 including a second molded plastic end cover grid located at said second end of said shell.

13. A desiccant cartridge as set forth in claim 12 wherein said ribs include ends which are spaced from said first and second ends of said shell.

14. A desiccant cartridge as set forth in claim 8 wherein said energy director members are located on said inner and outer annular rims.

15. A desiccant cartridge as set forth n claim 14 including second energy director members on said inner crossmember portions.

16. A desiccant cartridge as set forth in claim 8 wherein said ribs include ends which are spaced from said first and second ends of said shell.

17. A desiccant cartridge as set forth in claim 1 wherein said crossmembers are configured with said outer crossmember portions tapered outwardly away from said inner crossmember portions.

18. A desiccant cartridge as set forth in claim 17 wherein said outer annular portion of said molded plastic shell includes an outer surface, and an annular flexible sealing lip molded integrally with and extending outwardly from said outer surface of said outer annular portion of said shell.

19. A desiccant cartridge as set forth in claim 18 including a second molded plastic end cover grid located at said second end of said shell.

20. A desiccant cartridge as set forth in claim 19 wherein said ribs include ends which are spaced from said first and second ends of said shell.

21. A desiccant cartridge as set forth in claim 20 wherein said molded plastic end cover grid includes energy director members located on the side of said grid proximate said inner crossmember portions, and wherein said porous disc is fused to said end cover grid at said energy director members.

22. A desiccant cartridge as set forth in claim 21 wherein said energy director members are located on said inner and outer annular rims.

23. A desiccant cartridge as set forth in claim 22 including second energy director members on said inner crossmember portions.

24. A desiccant cartridge as set forth in claim 17 wherein said inner and outer annular rims include energy director members located on the side of said grid proximate said inner crossmember portions, and wherein said porous disc is fused to said end cover grid at said energy director members.

25. A desiccant cartridge as set forth in claim 24 including a second molded plastic end cover grid located at said second end of said shell.

26. A desiccant cartridge as set forth in claim 25 wherein said ribs include ends which are spaced from said first and second ends of said shell.

27. A desiccant cartridge as set forth in claim 25 wherein said outer annular portion of said molded plastic shell includes an outer surface, and an annular flexible sealing lip molded integrally with and extending outwardly from said outer surface of said outer annular portion of said shell.

28. A desiccant cartridge as set forth in claim 1 including a second molded plastic end cover grid which is similar to said end cover grid located at said second end of said shell, and wherein said inner crossmember portions taper toward said ribs, and wherein said outer crossmember portions taper away from said ribs.

29. A desiccant cartridge as set forth in claim 28 wherein said outer annular portion of said molded plastic shell includes an outer surface, and an annular flexible sealing lip molded integrally with and extending outwardly from said outer surface of said outer annular portion of said shell.

30. A desiccant cartridge as set forth in claim 29 wherein said molded plastic end cover grid includes energy director members located on the side of said grid proximate said inner crossmember portions, and wherein said porous disc is fused to said end cover grid at said energy director members.

31. A desiccant cartridge as set forth in claim 28 wherein said molded plastic end cover grid includes energy director members located on the side of said grid proximate said inner crossmember portions, and wherein said porous disc is fused to said end cover grid at said energy director members.

32. A desiccant cartridge as set forth in claim 31 wherein said ribs include ends which are spaced from said first and second ends of said shell.

33. A desiccant cartridge as set forth in claim 28 wherein said ribs include ends which are spaced from said first and second ends of said shell.

34. A desiccant cartridge as set forth in claim 1 wherein said end cover grid is substantially symmetrical about a horizontal centerline.

35. A desiccant cartridge as set forth in claim 34 wherein said outer annular portion of said molded plastic shell includes an outer surface, and an annular flexible sealing lip molded integrally with and extending outwardly from said outer surface of said outer annular portion of said shell.

36. A desiccant cartridge as set forth in claim 34 including a second end cover grid which is substantially symmetrical about a horizontal centerline.

37. A desiccant cartridge as set forth in claim 36 wherein said outer annular portion of said molded plastic shell includes an outer surface, and an annular flexible sealing lip molded integrally with and extending outwardly from said outer surface of said outer annular portion of said shell.

\* \* \* \* \*